(12) United States Patent
Makino

(10) Patent No.: US 7,085,428 B2
(45) Date of Patent: Aug. 1, 2006

(54) IMAGE DATA FORMING METHOD AND APPARATUS

(75) Inventor: Kazuhiro Makino, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 552 days.

(21) Appl. No.: 10/232,613

(22) Filed: Sep. 3, 2002

(65) Prior Publication Data
US 2003/0043285 A1 Mar. 6, 2003

(30) Foreign Application Priority Data
Sep. 5, 2001 (JP) .............................. 2001-268408

(51) Int. Cl.
*G06K 9/40* (2006.01)
(52) U.S. Cl. ...................... 382/266; 382/260; 382/299; 348/239; 348/218.1
(58) Field of Classification Search ................. 382/266
See application file for complete search history.

(56) References Cited

U.S. PATENT DOCUMENTS

| | | | | |
|---|---|---|---|---|
| 4,870,497 A | * | 9/1989 | Chamzas et al. ............ 382/240 |
| 4,873,577 A | * | 10/1989 | Chamzas ..................... 382/240 |
| 5,012,333 A | * | 4/1991 | Lee et al. .................... 358/520 |
| 5,124,811 A | * | 6/1992 | Ohsawa et al. ............. 358/448 |
| 5,140,432 A | * | 8/1992 | Chan ......................... 358/3.03 |
| 5,262,871 A | * | 11/1993 | Wilder et al. ............... 348/307 |
| 5,354,977 A | * | 10/1994 | Roustaei ................. 235/462.11 |
| 5,394,187 A | * | 2/1995 | Shipp ......................... 348/269 |
| 5,582,705 A | * | 12/1996 | Yeung et al. ............... 204/603 |
| 5,590,660 A | * | 1/1997 | MacAulay et al. ......... 600/478 |
| 5,761,341 A | * | 6/1998 | Go .............................. 382/232 |
| 5,784,432 A | * | 7/1998 | Kurtz et al. .................. 378/70 |
| 5,980,044 A | * | 11/1999 | Cannon et al. ............... 353/30 |
| 6,226,414 B1 | * | 5/2001 | Go .............................. 382/240 |
| 6,269,175 B1 | * | 7/2001 | Hanna et al. ............... 382/107 |

* cited by examiner

*Primary Examiner*—Bhavesh M. Mehta
*Assistant Examiner*—Sath V. Perungavoor
(74) *Attorney, Agent, or Firm*—Sughrue Mion, PLLC (57) ABSTRACT

An image forming method and apparatus that improves the S/N ratio of a low frequency component without causing losses to the data of a high frequency component. Low frequency image data representing the low frequency component of a sample is obtained by a CCD imaging means by use of a binning mode, and high frequency image data representing the high frequency component of a sample is obtained by the CCD imaging means without the use of a binning process. The low frequency image data and the high frequency image data are combined to form a synthesized image representing the sample.

11 Claims, 6 Drawing Sheets

IMAGE DATA FORMING METHOD AND APPARATUS

BACKGROUND OF THE INVENTION

1. Field of the Invention

The present invention relates to an image data forming method and apparatus, and in particular to an image data forming method and apparatus utilizing a CCD imaging element having a binning mode.

2. Description of the Related Art

There are known a variety of methods wherein: image data that has been obtained by a use of a CCD element is temporarily separated into high- and low-frequency image components; each component is subjected to image processes to enhance the outline of the image component, to smooth the image component and the like; then, the image components are again synthesized to form a synthesized image data appropriate to the desired use, such as observation or the like, to which the image is to be put.

In the field of biochemical analysis, for example, there are known protein analysis apparatuses that cause cataphoresis in proteins that have been processed, utilizing markers such as fluorescent pigments and the like, to create samples formed of cataphoresis patterns formed of bands constituted by a plurality of protein molecules aligned in a band oriented in the direction of an electrode. By irradiating these samples with an excitation light, the faint fluorescence emitted thereupon is obtained as image data, based upon which the aforementioned synthesized image data is formed and the protein analysis conducted.

The CCD imaging element employed in apparatuses such as those described above must be high resolution and high S/N ratio imaging elements in order to accurately detect the emission intensity data (concentration data), the position data of each band, and the like, of the faint fluorescence emitted from each cataphoresis band upon the irradiation thereof by the excitation light.

Further, regarding specific methods of forming synthesized image data that accurately represent the concentration data, position data and the like of each band, methods are known, for example, wherein: an obtained image data is separated into high frequency image data representing mainly the high frequency component and low frequency image data representing mainly the low frequency component; the high frequency image data is subjected to an edge enhancement process to render the outline of each band clear; the low frequency image data is subjected to a smoothing process to reduce the noise component, which is present primarily in the high frequency end of each band so as to render the concentration datamore precise; then, the two processed image data are synthesized to form a synthesized image data accurately representing the concentration and outline (position of each band) of each band.

However, because the fluorescence emitted from the sample and which represents the cataphoresis pattern is extremely faint, even if the low frequency image data is subjected to a smoothing process or the like and the noise on the comparatively high frequency side is reduced and the synthesized image data formed, there are cases in which it is impossible to discriminate between bands having respective different emission intensities (concentrations). The concentration of each band cannot be discriminated due to the fact that a portion of the concentration image data of each band of the image data obtained of the extremely faint fluorescence emission becomes buried in the noise included in the comparatively high frequency side of the low frequency image data; to prevent the concentration data from becoming buried in the noise, it is necessary to further raise the S/N ratio of the CCD imaging element.

Although the S/N ratio of the CCD imaging element can be raised by increasing the size of the area per pixel (e.g., by binning), generally speaking, if the size of the area per pixel is increased or the binning number made large, because the actual number of pixels of the CCD imaging element is reduced, the high frequency component of the image data suffers losses; that is to say, because the relation between the S/N ratio and resolution is one of trade-off, there is a problem in that it is difficult to improve the S/N ratio (reducing the quantity of noise of the low frequency side without causing losses on the high frequency side) without causing a deterioration in the resolution.

SUMMARY OF THE INVENTION

The present invention has been developed in view of the forgoing circumstances, and it is an object of the present invention to provide an image data forming method and apparatus capable of improving the S/N ratio of the low frequency component of an image data without causing deterioration of the high frequency component of the image data.

The image data forming method according to the present invention comprises the steps of: obtaining, by use of a CCD imaging means having a binning mode, high frequency image data representing the high frequency component of an image of a subject and low frequency image data representing the low frequency component of the image of the subject, respectively; and combining the low frequency image data and the high frequency image data to form a synthesized image data representing an image of the subject; wherein, the low frequency image data is obtained by use of a first binning mode of binning the pixels of the CCD imaging means, and the high frequency image data is obtained by use of a second binning mode that bins fewer pixels than the first binning mode of the CCD, or without the use of binning.

The image data forming apparatus according to the present invention comprises: a CCD imaging means having a binning mode; a frequency separating image data obtaining means for obtaining high frequency image data representing the high frequency component of a subject and low frequency image data representing the low frequency component of the subject, respectively; and an image data synthesizing means for combining the low frequency image data and the high frequency image data to form a synthesized image data representing an image of the subject; wherein, the frequency separating image data obtaining means obtains the low frequency image data by use of a first binning mode of binning the pixels of the CCD imaging means, and obtains the high frequency image data by use of a second binning mode that bins fewer pixels than the first binning mode of the CCD imaging means, or without the use of binning.

For cases in which the high frequency image data that has been obtained without the use of a binning process, the synthesized imaged data can be formed after said high frequency image data has been subjected to an edge enhancing process.

Note that the low frequency image data can consist of a plurality of low frequency image data obtained by the use of mutually different binning modes.

According to the image forming method and apparatus of the present invention: because the low frequency image data is obtained by use of the first binning mode of the CCD imaging means and the high frequency image data is obtained by use of the second binning mode of the CCD imaging means, which bins fewer pixels than the first binning mode, or without the use of a binning process, and the low frequency image data and the high frequency image data are combined to form a synthesized image data, there is no loss to the data of the high frequency component of the image data, and the S/N ratio of the low frequency component of the synthesized image data can be raised.

That is to say, because the quantity of readout noise produced from the pixels included in a one binning region unit, regardless of the number of pixels binned (the number of pixels per one binning unit) is substantially equivalent to the quantity of readout noise produced from one pixel when binning is not performed, by increasing the number of pixels binned, the quantity of readout noise per pixel can be reduced. Accordingly, by obtaining the low frequency image data by use of the first binning mode, in order to reduce the readout noise of the low frequency component, and by obtaining the high frequency image data by use of the second binning mode, in which fewer pixels are binned than in the first binning mode, or without employing a binning process in the obtainment thereof in order to prevent the losses in the data of the high frequency component, in comparison to the conventional practice, wherein the low frequency image data and the high frequency image data are obtained from a single image data (i.e., when the low frequency image data and the high frequency image data have been obtained by binning the same number of pixels, or both said image data have been obtained without employing a binning process), the S/N ratio of the low frequency component can be raised.

Note that the ratio of the readout noise contained in the high frequency image data to the readout noise contained in the low frequency image data is represented by the square root of the ratio of the binning pixels number H of the second binning mode, which is employed when the high frequency image data is obtained, to the binning pixels number L of the first binning mode, which is employed when the low frequency image data is obtained: $(H/L)^{1/2}$; or by the square root of the ratio $(1/L)^{1/2}$, which is the ratio employed for cases in which the high frequency image data has been obtained without the use of a binning process.

Further, if the high frequency image data is obtained without employing a binning process and is then subjected to an edge enhancement process and utilized in forming a synthesized image data, the outline of the image represented by the synthesized image data can be made clearer.

DESCRIPTION OF THE PREFERRED EMBODIMENTS

Figure 1:
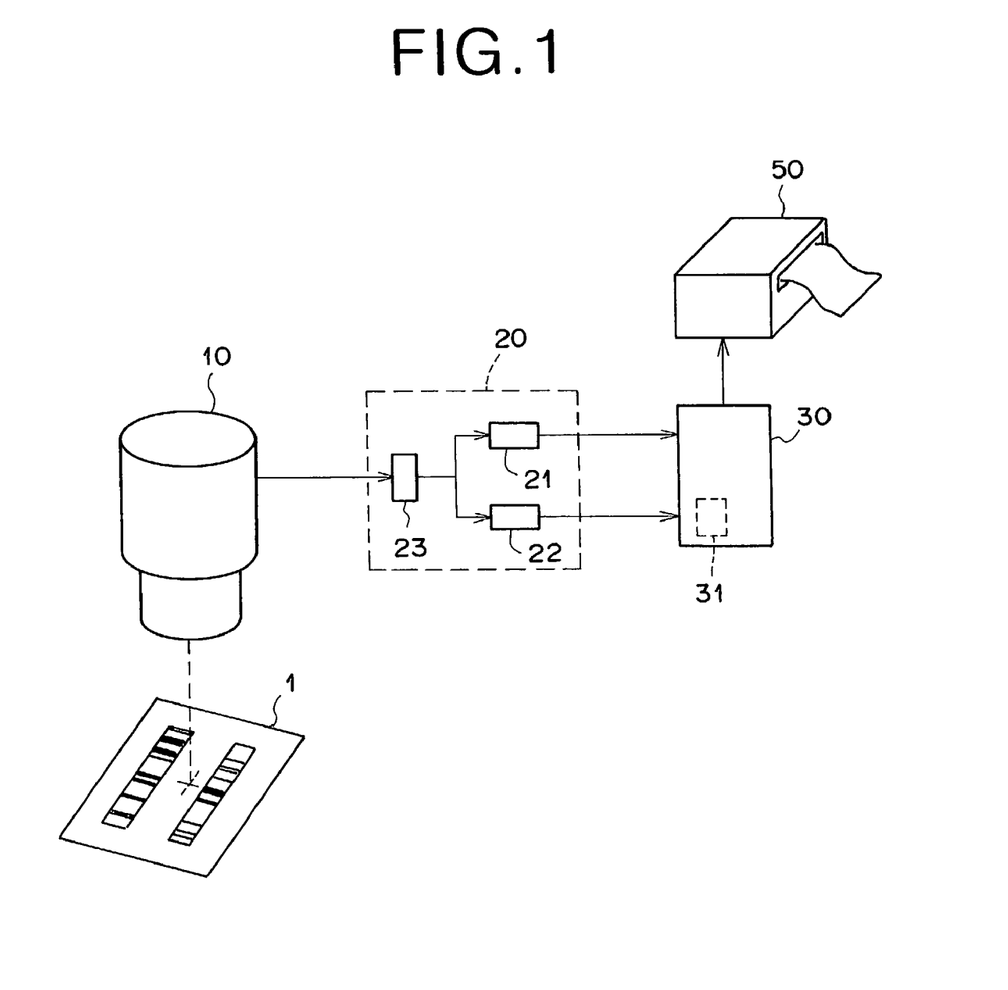
FIG. 1 is a block diagram of the main part of the preferred embodiment of the image data forming means according to the present invention.
Figure 2:
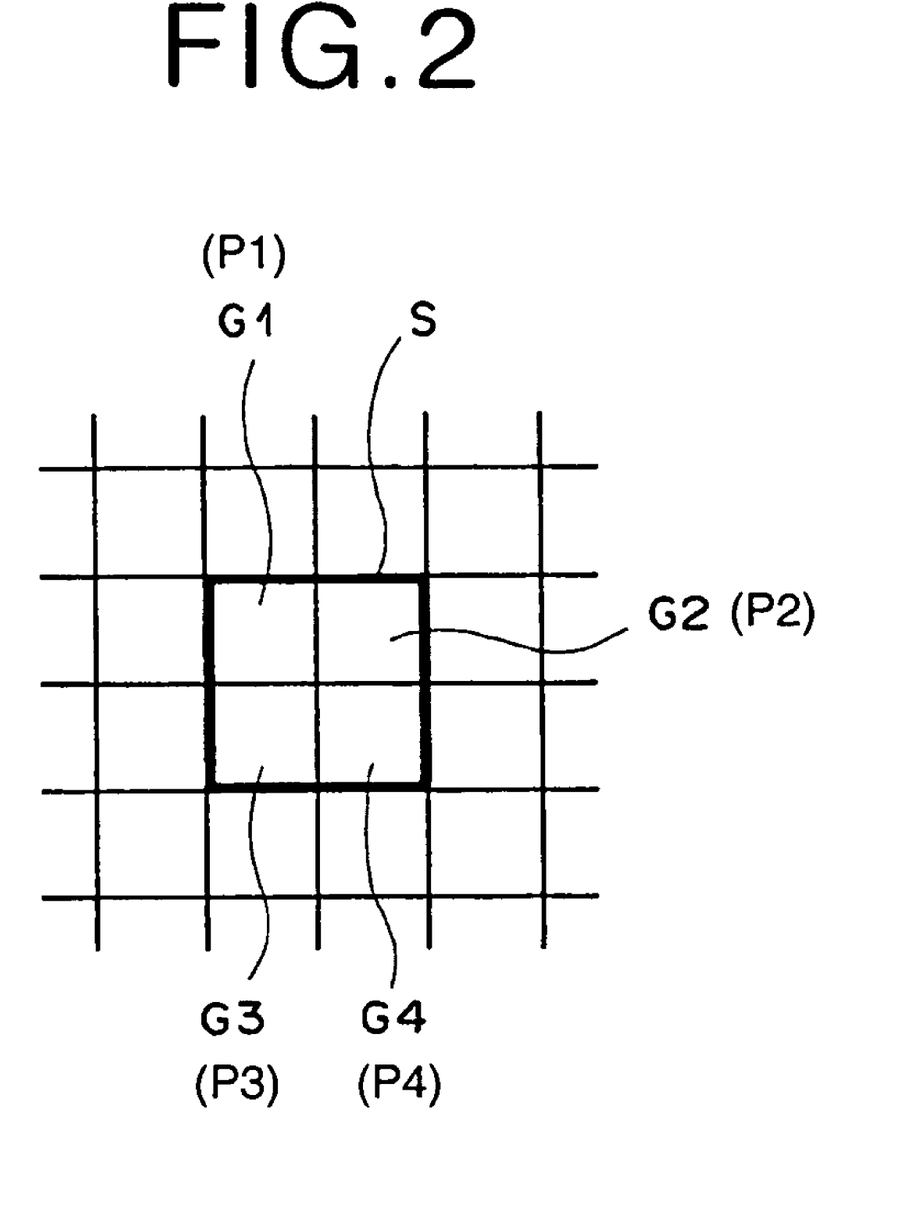
FIG. 2 is a drawing illustrating the state of the CCD imaging means when the pixels are binned.

Hereinafter the preferred embodiment of the present invention will be explained with reference to the attached drawings. FIG. 1 is a block diagram of the main part of the preferred embodiment of the image data forming means according to the present invention. FIG. 2 is a drawing illustrating the state of the CCD imaging means when the pixels are binned The image forming apparatus according to the present invention comprises: a CCD imaging means 10 having a binning mode; a frequency separating image data obtaining means 20 for obtaining, of a sample 1 which is the subject, high frequency image data representing the high frequency component of the sample 1 and low frequency image data representing the low frequency component of the sample 1, respectively; and an image data synthesizing means 30 for combining the low frequency image data and the high frequency image data to form a synthesized image data representing an image of the sample 1.

The frequency separating image data obtaining means 20 is a means for obtaining the low frequency image data, by use of a first binning mode of the CCD imaging means 10, and the high frequency image data, which is obtained without the use of a binning process.

The sample 1 is a planar shaped sample representing a cataphoresis pattern of a protein that has been labeled with a fluorescent pigment.

The image data synthesizing means 30 is provided with an edge enhancement process means for enhancing the edges of the high frequency image data obtained without the use of a binning process.

Next, the operation of the embodiment described above will be explained.

After the binning mode of the CCD imaging means 10 has been set at four pixels, which is the binning pixels number of the first binning mode, excitation light is emitted from an excitation light source (not shown) and projected onto the sample 1; the fluorescence emitted from the sample 1 upon the irradiation thereof by the excitation light is imaged by the CCD imaging means 10 to obtain low frequency image data. Note that excitation light or the like reflected from the sample 1 or the like entering the CCD imaging means 10 is cutoff by an excitation light cutoff filter before being received by the CCD imaging means 10; whereby only the fluorescence emitted from the sample 1 is received by the CCD imaging means 10.

Next, the fluorescence emitted from the sample 1 is imaged, without the use of a binning process, by the CCD imaging means 10 to obtain high frequency image data. The obtained low frequency image data and high frequency image data are then outputted from the CCD imaging means 10.

The two image data outputted from the CCD imaging means 10 are inputted to the frequency separating image data obtaining means 20 and temporarily stored in the image buffer 23, then separated into the low frequency side image data, which has been obtained by use of the first binning mode, and the high frequency side image data, which has been obtained without the use of a binning process. The low frequency image data obtained by use of the first binning mode is stored in a first image memory 21, and the high frequency image data obtained without the use of a binning process is stored in a second image memory 22.

Here, an explanation of the quantity of readout noise contained in the low frequency image data obtained by use of the first binning mode and stored in the first image memory 21 will be given.

As shown in FIG. 2, the values P1, P2, P3 and P4 of the image data (high frequency image data) obtained without binning pixels G1, G2, G3 and G4 of the CCD imaging means 10 are formed of the readout noise value Z and the other values A1, A2, A3 and A4. That is to say, the sum of the high frequency image data of the four pixel portion described above is: $W=P1+P2+P3+P4=(A1+A2+A3+A4+(4Z)^{1/2})$. On the other hand, if the four pixels G1, G2, G3 and G4 are binned as a single unit binning region pixel S, because the sum W' of the image data (low frequency image data) obtained by use of the first binning mode contains only an amount of readout noise equivalent to that of the readout noise value Z of a single pixel portion, the value W' becomes: $W'=(A1+A2+A3+A4)+Z$, wherein the readout noise is only half of that produced when the sum value of the image data of the four pixels obtained without the use of a binning process is obtained.

The low frequency image data stored in the first image memory 21 and the high frequency image data stored in the second image memory 22 are inputted to the image data forming means 30; the image data for each pair of corresponding pixels is obtained by addition to synthesize a synthesized image data representing the sample 1.

The synthesized image data is outputted from the image data synthesizing means 30 and printed out by a printer 50.

Note that, although according to the above-described embodiment the high frequency image data has been obtained without the use of a binning process, the high frequency image data can be obtained by binning fewer pixels than the number of pixels binned according to the first binning mode are binned, that is, by use of a second binning mode wherein fewer pixels than the number binned according to the first binning mode are binned.

Further, the image data synthesizing means 30 can subject the inputted low frequency image data and/or high frequency image data to a Fourier transform, and perform a predetermined image process (e.g., a weighted addition or the like between each frequency component) on frequency ranges, and then perform a reverse Fourier transform on each respective image data to obtain the synthesized image data.

Still further, the low frequency image data can be obtained based on a plurality of image data that have been obtained a plurality of mutually different binning modes of the CCD imaging means.

Figure 3:
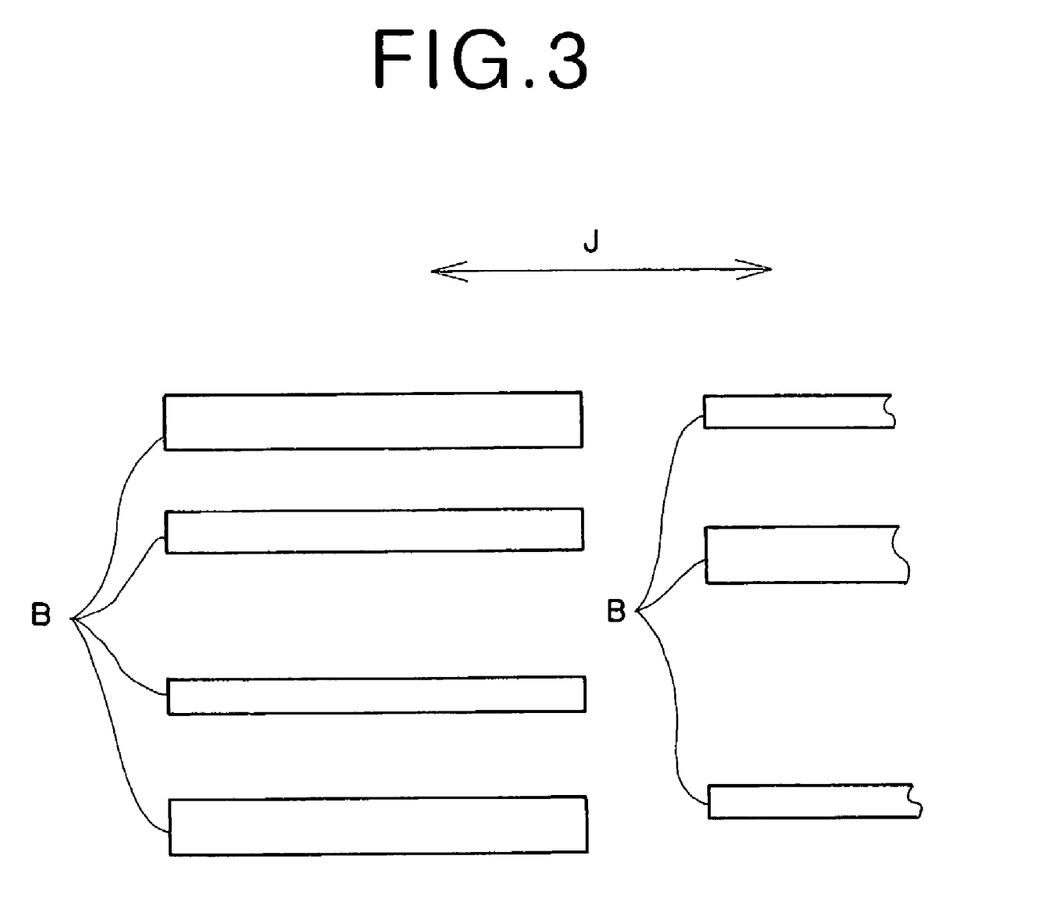
FIG. 3 is a drawing showing the state of the outline along the lengthwise direction of the bands of a cataphoresis pattern.
Figure 4:
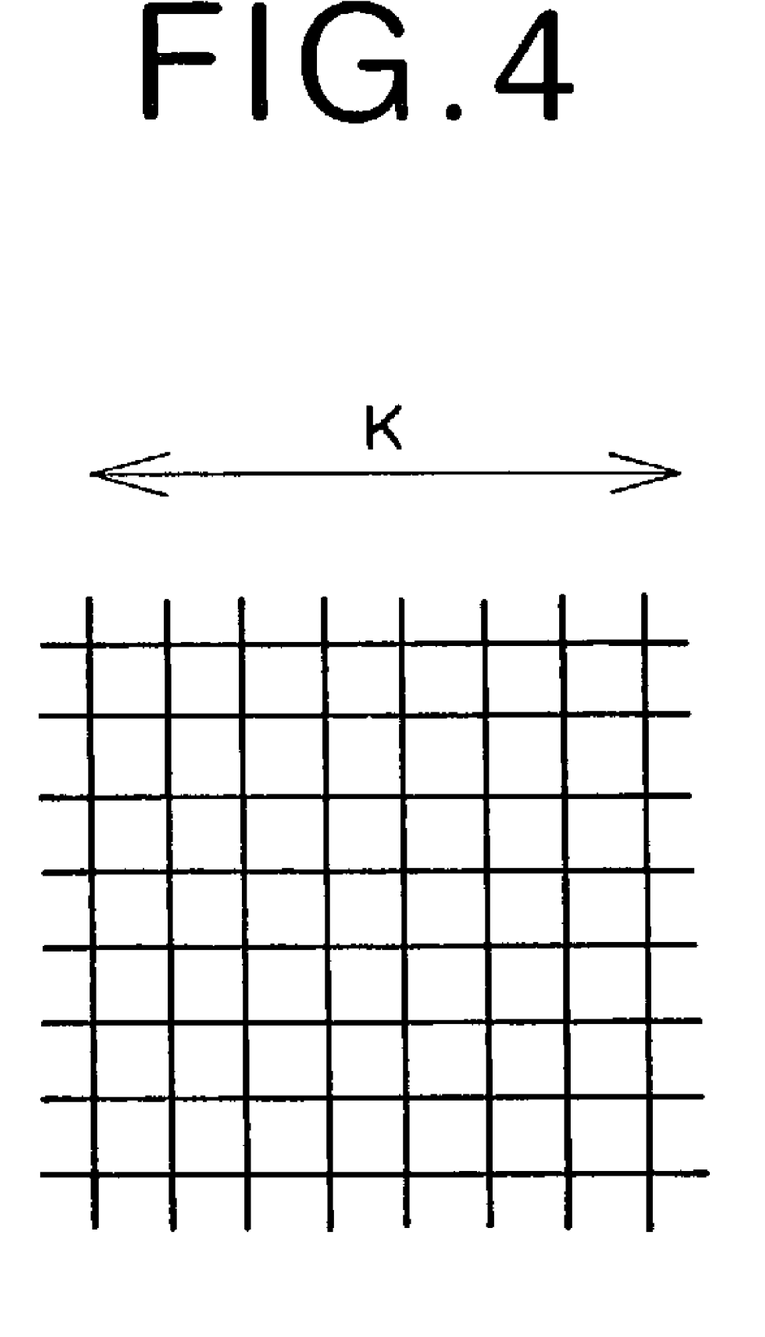
FIG. 4 is a drawing illustrating the pixels of the imaging means.
Figure 5:
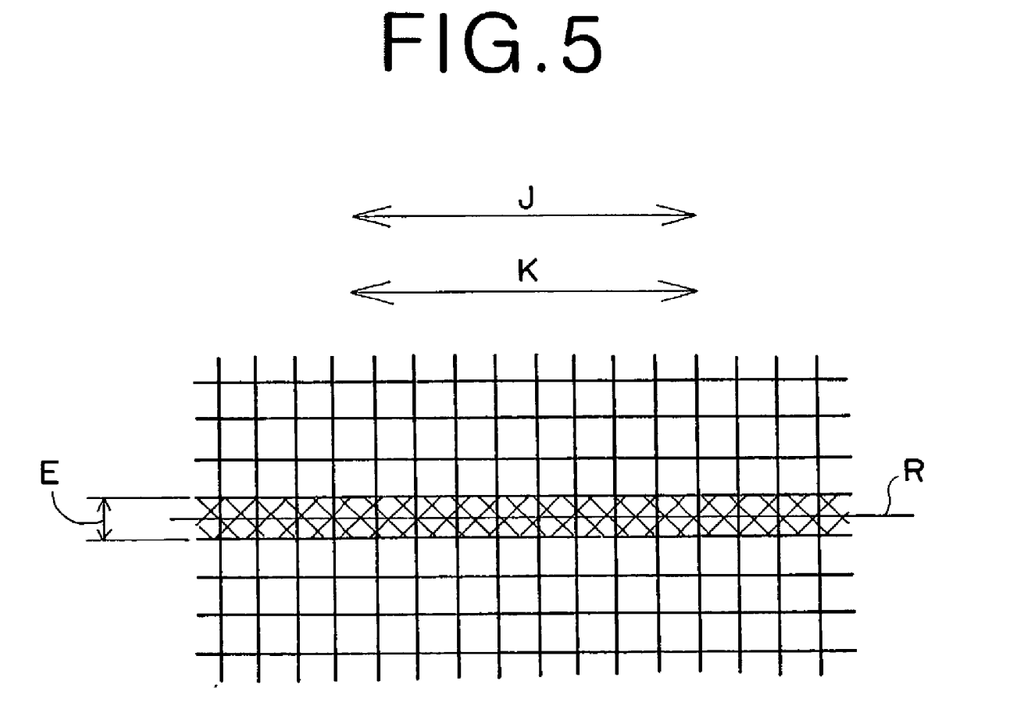
FIG. 5 is a drawing of the state in which the direction of the outline of the bands and the direction of the binning pixels are matched.
Figure 6:
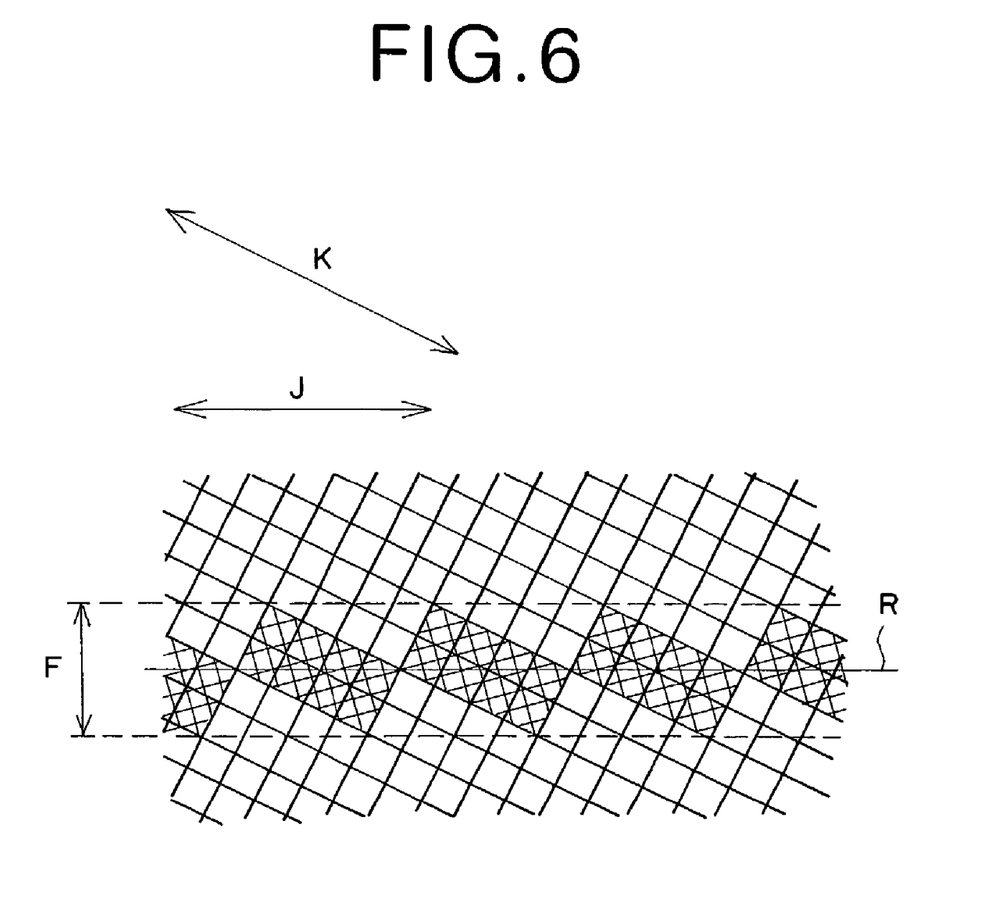
FIG. 6 is a drawing of the state in which the direction of the outline of the bands and the direction of the binning pixels are not matched.

In addition, by adjusting the orientation of the sample 1 and the orientation of the imaging means so as to cause the direction J (see FIG. 3), which represents the outline of the state along the lengthwise direction of bands B forming the cataphoresis pattern, and the direction K (see FIG. 4), which is the alignment direction of the pixels to be binned by the imaging means, to be the same direction, more accurate data of the outline of the bands can be obtained, in comparison to the case wherein the direction J representing the outline of the bands and the direction K representing the alignment direction of the pixels to be binned are not matched. That is to say, in a case, for example, as shown in FIG. 5, wherein the direction K of the alignment of four pixels that are to be binned, and the direction J representing the outline R of a band are the same direction, only the image data representing the width E of a single pixel portion yields an inaccurate value. However, for a case in which the direction K and the direction J are different directions, the four pixels to be binned and the outline R of the band intersect diagonally, as shown in FIG. 6; because inaccurate image data is obtained of a width F, which is wider than the width E of a one pixel portion, more accurate data of the outline of the band is obtained for the case in which the direction J and the direction K match.

According to the present invention as described above, the S/N ratio of the low frequency component of the image data can be improved without causing losses to the data of the high frequency component of the image data.

What is claimed is:

1. An image data forming method comprising the steps of:
   obtaining, by use of a CCD imaging means having a binning mode, high frequency image data representing the high frequency component of an image of a subject and low frequency image data representing the low frequency component of the image of said subject, respectively, and
   combining the low frequency image data and the high frequency image data to form a synthesized image data representing an image of the subject, wherein
   the CCD imaging means obtains the low frequency image data by use of a first binning mode of binning the pixels of the CCD imaging means, and
   the CCD imaging means obtains the high frequency image data by use of a second binning mode that bins fewer pixels than the first binning mode of the CCD imaging means, or without the use of binning.

2. An image data forming method as described in claim 1, wherein
   high frequency image data that has been obtained without the use of a binning process is subjected to an edge enhancement process, and then the synthesized image data is formed.

3. An image data forming apparatus comprising:
   a CCD imaging means having a binning mode,
   a frequency separating image data obtaining means for obtaining high frequency image data representing the high frequency component of a subject and low frequency image data representing the low frequency component of said subject, respectively, and
   an image data synthesizing means for combining the low frequency image data and the high frequency image data to form a synthesized image data representing an image of the subject, wherein
   the frequency separating image data obtaining means obtains the low frequency image data by use of a first binning mode of binning the pixels of the CCD imaging means, and
   the frequency separating image data obtaining means obtains the high frequency image data by use of a second binning mode that bins fewer pixels than the first binning mode of the CCD imaging means, or without the use of binning.

4. An image data forming apparatus as described in claim 3, wherein
   the frequency separating image data obtaining means is a means for obtaining the high frequency image data without employing a binning process, and
   the image data synthesizing means performs an edge enhancement process on the high frequency image data, and then forms the synthesized image data.

5. An image data forming method as described in claim 1, wherein the high frequency image data and the low frequency image data are obtained by fluorescence emitted from the subject.

6. An image data forming apparatus as described in claim 3, wherein the high frequency image data and the low frequency image data are obtained by fluorescence emitted from the subject.

7. An image data forming method as described in claim 5, wherein the fluorescence emitted by the image of the subject is first imaged by the CCD imaging means to obtain the low frequency image data and the fluorescence emitted by the image of the subject is subsequently imaged by the CCD imaging means to obtain the high frequency image data.

8. An image data forming apparatus as described in claim 6, wherein the fluorescence emitted by the image of the subject is first imaged by the CCD imaging means to obtain the low frequency image data and the fluorescence emitted by the image of the subject is subsequently imaged by the CCD imaging means to obtain the high frequency image data.

9. An image data forming method as described in claim 1, wherein a direction representing an outline of bands of the subject and a direction representing an alignment direction of binned pixels are substantially the same.

10. An image data forming apparatus as described in claim 3, wherein a direction representing an outline of bands of the subject and a direction representing an alignment direction of binned pixels are substantially the same.

11. An image data forming method comprising:

obtaining, by use of a CCD imaging means having a binning mode, high frequency image data representing the high frequency component of an image of a subject and low frequency image data representing the low frequency component of the image of said subject, respectively, and synthesizing the low frequency image data and the high frequency image data to form a synthesized image data representing an image of the subject, wherein the CCD imaging means obtains the low frequency image data by use of a first binning mode of binning the pixels of the CCD imaging means, and the CCD imaging means obtains the high frequency image data by use of a second binning mode that bins fewer pixels than the first binning mode of the CCD imaging means, or without the use of binning.

* * * * *